United States Patent [19]
Mueller et al.

[11] Patent Number: 5,282,523
[45] Date of Patent: Feb. 1, 1994

[54] TRAVEL LIMIT STOP FOR A MOTOR DRIVEN ACTUATOR

[75] Inventors: Robert S. Mueller, Birmingham; Don J. Krzysik, Wixom; Donald R. Haefner, Oak Park, all of Mich.

[73] Assignee: Eaton Corporation, Cleveland, Ohio

[21] Appl. No.: 825,908

[22] Filed: Jan. 27, 1992

[51] Int. Cl.$^5$ .............................................. F02D 11/10
[52] U.S. Cl. .................................... 192/139; 74/89.14
[58] Field of Search .................. 192/141, 139, 149; 74/85.14

[56] References Cited

U.S. PATENT DOCUMENTS

| | | | |
|---|---|---|---|
| 1,090,259 | 3/1914 | Watson | 74/89.14 |
| 2,227,114 | 12/1940 | Tear | 192/141 |
| 2,306,723 | 12/1942 | Floraday | 74/89.14 |
| 2,714,822 | 8/1955 | Reeves | 192/141 X |
| 2,907,225 | 10/1959 | Pischke | 192/139 X |
| 2,944,436 | 7/1960 | Pickles | 192/141 X |
| 3,277,736 | 10/1966 | Goodman | 192/141 X |
| 3,293,925 | 12/1966 | Linsley | 192/141 X |
| 3,319,481 | 5/1967 | Goodman | 192/141 X |
| 4,852,419 | 8/1989 | Kittel et al. | 74/89.14 |
| 4,950,965 | 8/1990 | Kenny et al. | 123/400 X |
| 5,088,339 | 2/1992 | Lochmoeller | 192/141 X |
| 5,161,504 | 11/1992 | Guest et al. | 123/361 |

Primary Examiner—Rodney H. Bonck
Attorney, Agent, or Firm—L. H. Uthoff, Jr.

[57] ABSTRACT

A motor driven actuator having a mechanical stop radially protruding from the motor output shaft which contacts the output mechanism upon reaching an extreme of travel thereby stopping the rotation of the motor by imparting a tangential stopping force thereby stopping the movement of the output mechanism while minimizing forces generated in the actuator drive mechanism.

4 Claims, 4 Drawing Sheets

FIG 2
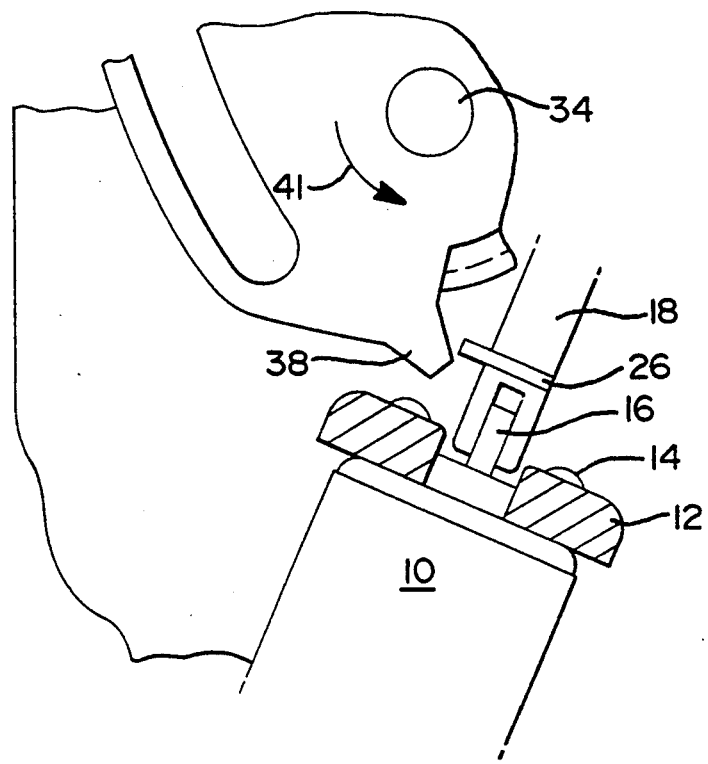
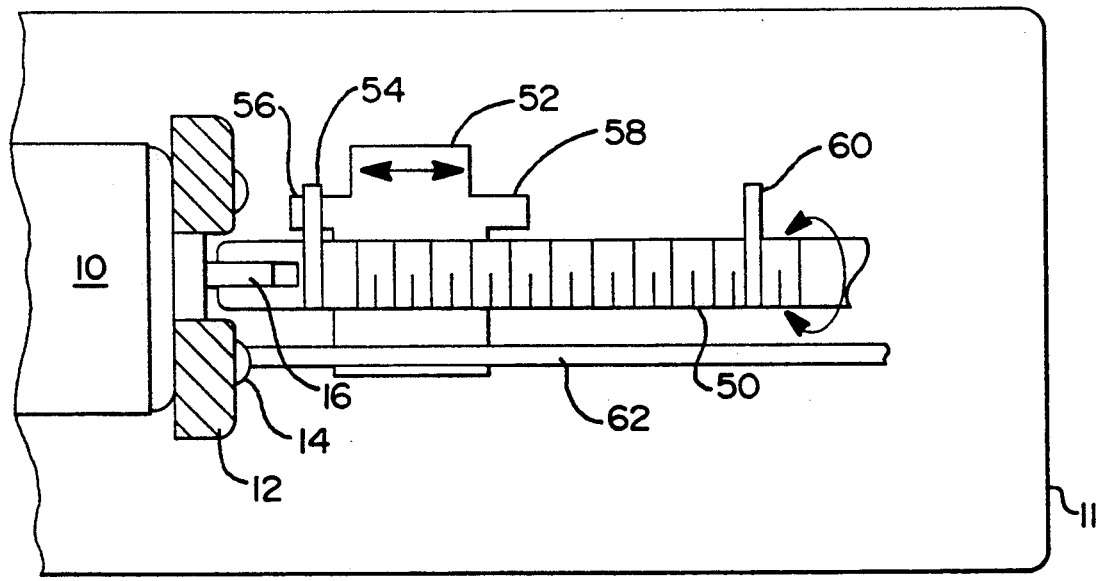
FIG 5

TRAVEL LIMIT STOP FOR A MOTOR DRIVEN ACTUATOR

RELATED APPLICATIONS

This application is related to application U.S. Ser. No. 07/736,659 entitled "Dual Mode Electrical Servo-actuator" filed on Jul. 26, 1991, now U.S. Pat. No. 5,161,504, and assigned to the same assignee, Eaton Corporation, as this application.

FIELD OF THE INVENTION

The present invention relates to a mechanical method of stopping the motion of a motor driven actuator at its end points without mechanical damage or jamming. More specifically, this invention relates to a mechanical method of stopping a motor driven actuator at its end points by stopping the rotation of the drive motor at the end point by providing a radially protruding mechanical extension to the motor output shaft which tangentially contacts a portion of the structure of the output mechanism.

DESCRIPTION OF THE PRIOR ART

Traditionally, the motion of a motor driven actuator has been limited at its extremes of travel when the output mechanism mechanically contacts a mechanical stop at one extreme which can consist of a mechanical protrusion from the support case which contacts a portion of the output mechanism thereby abruptly stopping the travel of the output mechanism. In a like manner, at the other extreme of travel the motion of the output mechanism is abruptly stopped through mechanical contact between the output mechanism and the support case. This prior art method effectively works to limit the travel of the output mechanism to a specified range of travel, however, the forces generated in the drive and driven mechanism can be extraordinarily high, often resulting in a jamming of the mechanism or mechanical failure due to the high forces. If a worm drive gear is used, the high forces cause jamming of the device at the mesh between the drive and the driven gears.

Another method to limit the travel of a motor driven actuator is to position an electrical switch so that at the extreme of travel the output mechanism contacts the switch and opens an electrical circuit thereby terminating the flow of electrical power to the drive motor thereby stopping the mechanism. In a like manner, at the other extreme of travel a second switch can be located to perform a similar function. The problem with this approach is the inability to reliably stop the mechanism prior to mechanical binding or other types of failures due to overtravel. The momentum of the motor drive mechanism changes depending on the prior duty cycle of the motor which can result in an overrun condition where the electrical power is terminated by the limit switch but the continued rotation of the motor due to momentum drives the mechanism beyond the desired stopping point resulting in binding.

Another prior art method to limit travel of a motor driven actuator is to measure the position of the output mechanism through the use of a position sensor such as a potentiometer. The value of the potentiometer indicates the position of the output mechanism which is electrically communicated to a control algorithm which uses the information to terminate the power to the motor. Again, the problem with this approach is the momentum of the motor depends on the prior duty cycle which can drive the mechanism beyond the desired position. In addition, the reliability of the potentiometer becomes a problem where upon its failure, there is no longer effective control of the range of travel resulting in mechanical binding or other structural damage. Another problem is that intermittent spurious electrical noise can result in overtravel.

SUMMARY OF THE INVENTION

The present invention provides a mechanical means for limiting the travel of a motor driven actuator especially one which employs a high gear reduction such as a worm gear driving an output mechanism. The rotation of the drive motor is mechanically stopped by a protruding mechanical extension mounted on the motor output shaft which contacts a part of the output mechanism in a tangential manner which serves to abruptly stop the rotation of the motor irrespective of the presence of the motor drive current without inducing excessive mechanical loads at the drive gear mesh. In this manner, the actuator travel can be limited to a desired range without the disadvantage of mechanical binding and/or structural damage and the motor can then be reversed with minimal additional force needed to move the output mechanism in the opposite direction of travel. The travel limit stop of the present invention can function as a backup to the limits contained in the actuator control software contained in a control system or as a backup to electrical limit switches, both of which currently exist in the prior art.

Motor driven actuators have been fabricated which employ limit switches and/or software travel limits, however, changes in conditions and erroneous control signals occasionally produce excursions of the output mechanism into undesirable regions which can result in structural damage or mechanical binding thereby preventing the device from operating in its intended manner. The present invention requires minimum modification of a basic drive mechanism and provides for a redundancy to electrical approaches to limiting travel of a motor driven actuator. A mechanical means is disclosed which effectively minimizes the mechanical loading experienced by the actuator mechanism by stopping the rotation of the drive motor through a tangential force to limit the travel of the output mechanism and allowing the actuator mechanism to be reversed with minimal additional force.

BRIEF DESCRIPTION OF THE DRAWINGS

FIG. 2 is a cross-sectional view of the motor driven actuator shown in FIG. 1 showing the travel limit stop of the present invention one motor rotation prior to engagement;

FIG. 5 is a sectional view of a motor driven actuator utilizing a third embodiment of the present invention.

DESCRIPTION OF THE PREFERRED EMBODIMENT

Figure 1:
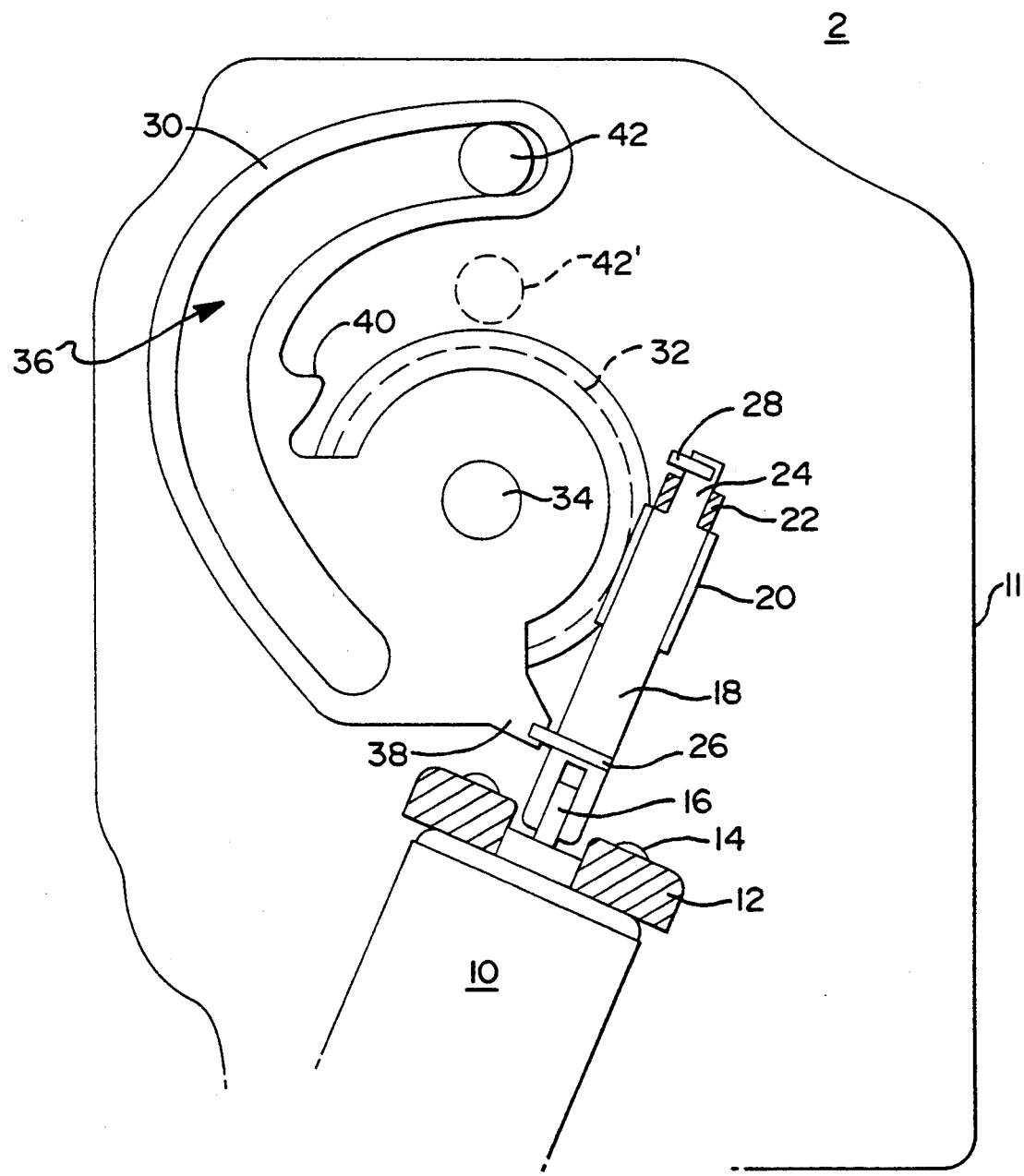
FIG. 1 is a cross-sectional view of a motor driven actuator utilizing the mechanical travel limit stops of the present invention.
Figure 3:
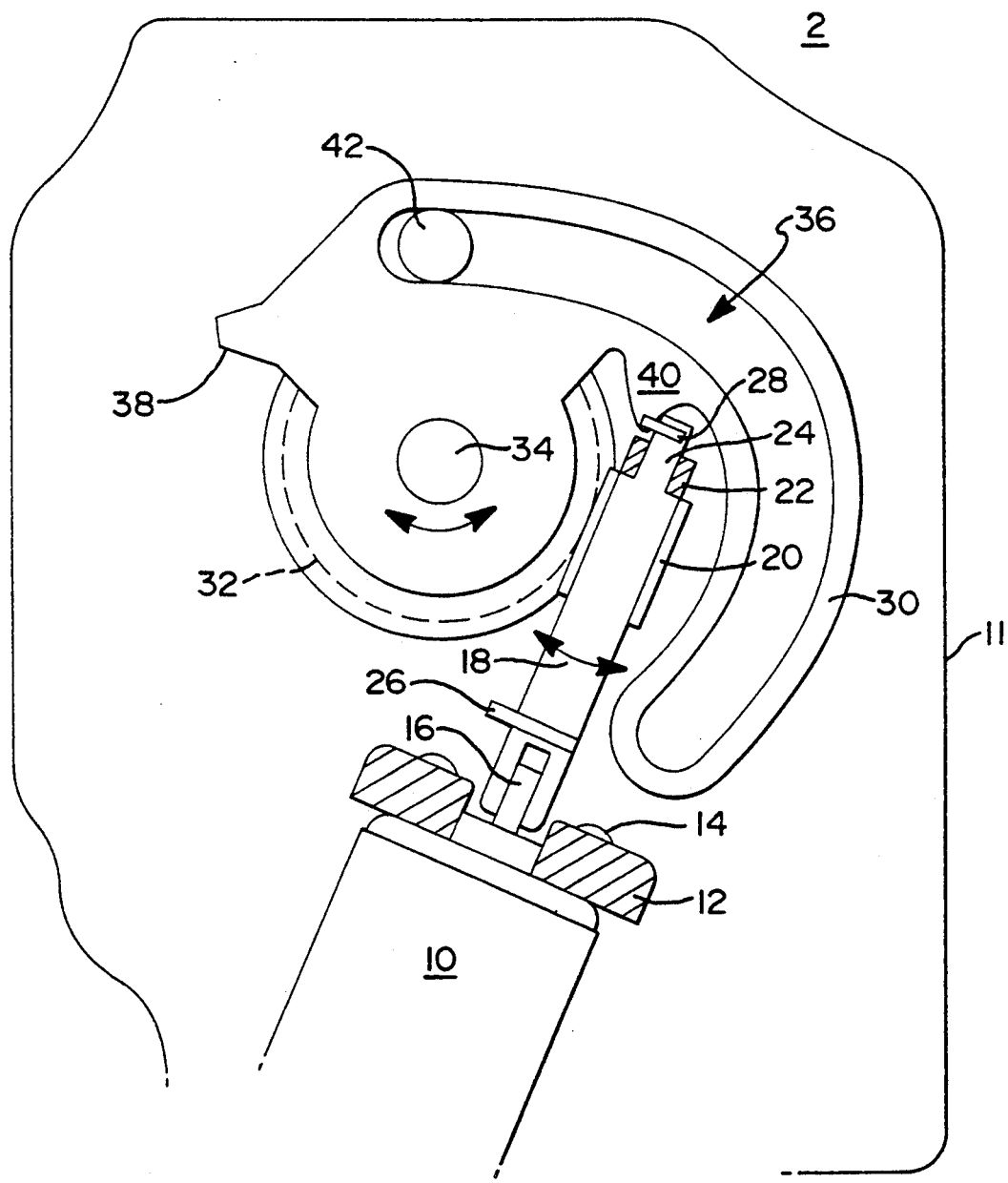
FIG. 3 is a cross-sectional view of a motor driven actuator utilizing the stops of the present invention at a second extreme of travel.

Referring to FIG. 1, a motor driven actuator 2 is shown where a motor 10 is mounted to a support housing 11 by way of a motor bracket 12 which is secured to the support housing 11 where the motor 10 is secured to the motor bracket 12 with mounting bolts 14. The motor 10 has an output shaft 16 which rotates and is nonrotatably secured to the drive shaft 18 which extends and forms or is attached to a drive gear 20 which can be a worm gear. The drive shaft 18 is supported by extension bearing 22 which is mounted to the support housing 11 at a smaller diameter portion identified as shaft extension 24 in which the shaft extension 24 rotates and is supported thereby. A similar motor driven actuator is disclosed in application U.S. Ser No. 07/736,659, the disclosure of which is hereby expressly incorporated by reference.

The drive shaft 18 contains a mechanical protrusion in the form of first stop pin 26 which is secured to the drive shaft 18 and rotates therewith. In a like manner, the shaft extension 24 holds a second stop pin 28 which protrudes from the outer surface and rotates therewith. The drive gear 20 meshes with a mechanism drive gear 32 where upon rotation of the motor output shaft 16, the drive shaft 18 is rotated thereby rotating drive gear 20 which meshes with the mechanism drive gear 32 resulting in a rotation of the mechanism drive gear 32. The actuator output mechanism 30 is attached to the mechanism drive gear 32 such that it rotates with the mechanism drive gear 32 supported by a mechanism pivot 34 which is mounted to the support housing 11.

The actuator output mechanism 30 contains a mechanism slot 36 which serves to locate an output pin 42 where the output pin 42 is connected to a second device that is to be moved where the output pin 42 moves in a linear fashion along the support housing. The actuator output mechanism 30 also includes a first mechanism stop 38 and a second mechanism stop 40, both mechanically protruding from the actuator output mechanism so as to contact the first stop pin 26 and the second stop pin 28 at the extremes of travel of the actuator output mechanism 30. The first stop pin 26 and/or the second stop pin 28 can be made from a material having some resilience in the preferred embodiment. The resilience characteristic reduces the engagement shock forces when the first stop pin 26 or the second stop pin 28 encounter the first mechanism stop 38 or the second mechanism stop 40 respectively. When the actuator 2 is in its normal range of travel, the actuator output mechanism 30, the first stop pin 26, and the second stop pin 28 rotate freely without contacting any other surface.

FIG. 2 shows the actuator with the motor 10 one rotation just prior to the end of its mechanical travel limit. As the motor 10 rotates one additional revolution (thereby rotating the drive shaft 18 and the drive gear 20 which meshes and rotates the mechanism drive gear 32), the actuator output mechanism 30 rotatably moves in the direction as shown by arrow 41 until the first mechanism stop 38 contacts the first stop pin 26 as shown in FIG. 1, whereupon the motor 10 rotation is abruptly stopped due to the tangential force imparted to the motor output shaft 16 by the first mechanism stop 38 thereby limiting the travel of the actuator output mechanism 30.

The output pin 42 is shown as a solid line at one extreme of travel and also as a dotted line output pin 42, as the output mechanism would be positioned at its opposite extreme of travel as shown in FIG. 2.

In a like manner, as the motor 10 is rotated in an opposite direction, the actuator output mechanism travels until the second mechanism stop 40 is contacted by the second stop pin 28, again abruptly stopping rotation of the motor 10 and the travel of the actuator output mechanism 30. FIG. 2 shows the same actuator in this second extreme of travel where the second mechanism stop 40 is contacted by the second stop pin 28 thereby stopping rotation of motor 10 and the actuator output mechanism 30.

Figure 4:
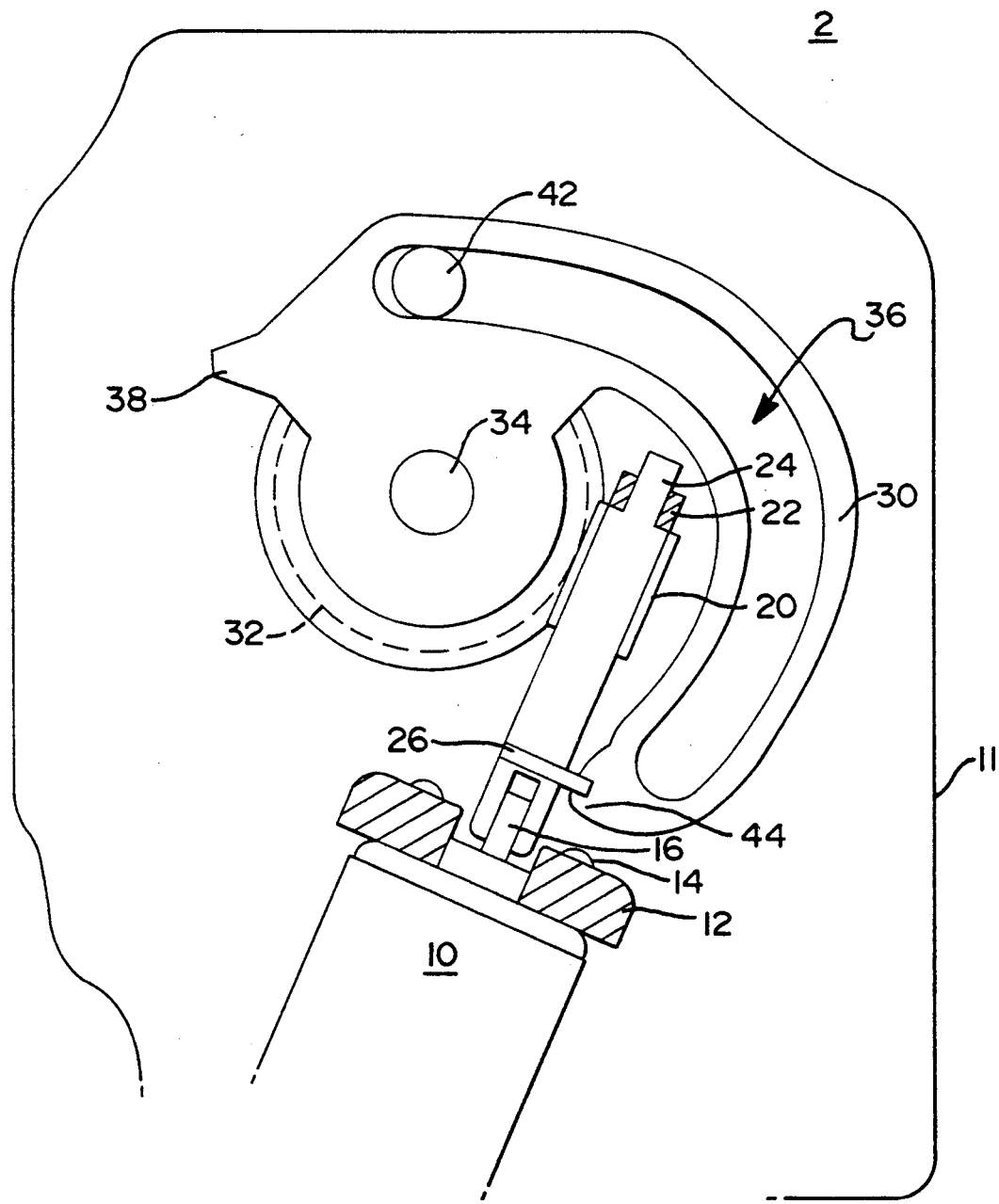
FIG. 4 is a sectional view of a motor driven actuator utilizing a second embodiment of the present invention at the second extreme of travel.

Now referring to FIG. 4, an alternative embodiment is shown which utilizes only the first stop pin 26 to stop the rotation of motor 10 at both extremes of travel. At the first extreme, in a similar fashion to that shown in FIG. 1, the first mechanism stop 38 comes in contact with the first stop pin 26 stopping the rotation of the motor 10 by imparting a tangential stopping force to the motor output shaft 16 thereby stopping the movement of the actuator output mechanism 30. As the motor 10 current is reversed, the first mechanism stop 38 moves a sufficient distance to clear the first stop pin 26 with only one revolution of the motor output shaft 16 as shown in FIG. 2.

The first stop pin 26 can also be used to stop rotation of the motor 10 and the motion of actuator output mechanism 30 at the second extreme of travel by coming in contact with an alternate second mechanism stop 44 which is a part of the actuator output mechanism 30. When the actuator 2 is in its normal range of travel, the first stop pin 26 misses the first mechanism stop 38 and the alternate second mechanism stop 44 allowing the motor 10 to freely rotate in either direction.

As the actuator output mechanism 30 nears the end of its mechanical range of travel, the motor 10 continues to freely rotate until the first stop pin 26 comes in contact with either the first mechanism stop 38 or the alternate second mechanism stop 44 which stops the rotation of the motor 10. One rotation of the motor 10 in the opposite direction results in sufficient movement of the actuator output mechanism 30 that the first stop pin 26 again misses both the first mechanism stop 38 and the alternate second mechanism stop 44. The first mechanism stop 38 and the alternate second mechanism stop 44 can be made of a material having resilient qualities to cushion the impact of the stop pin 26 against either the first mechanism stop 38 and/or the alternate second mechanism stop 44.

A third embodiment of the present invention is shown in FIG. 5 where an actuator 4 includes a motor 10 which is nonrotatably connected to a threaded drive shaft 50 similar to that disclosed in U.S. Pat. No. 4,950,965, the disclosure of which is hereby expressly incorporated by reference. The threaded drive shaft 50 is nonrotatably connected to the same drive gear 20 which is drivingly engaged with a mechanism drive gear 32 and the actuator output mechanism 30 shown in FIG. 4. The actuator output mechanism 30 would not included drive stops 38 and 44 as this third embodiment replaces these with threaded member 52. Threaded member 52 is internally threaded so as to engage the threaded drive shaft 50 and move in a linear fashion as the threaded drive shaft 50 is rotated by the drive motor 10. The threaded member 52 is prevented from rotating with the threaded drive shaft 50 by an antirotation guide rail 62 which is fixed to the support housing 11. Guide rail 62 also serves as the reaction point for stopping forces transmitted through threaded member 52. The threaded member 52 slides along the antirotation guide rail 62.

The threaded member 52 can be connected to a second, separate device which is to be moved by the actuator 4 directly or through the action of some additional mechanism contained in the actuator housing 11 such as a bellcrank mounted to the threaded member 52. Or, in the alternative, the threaded member 52 can function only as a travel limit stop where the threaded drive shaft 50 is drivingly connected to a drive gear which moves an output mechanism.

A first motor stop pin 54 radially protrudes and is secured to the threaded drive shaft 50 on the motor output shaft 16. A first member travel stop 56 is positioned on the threaded member 52 so that it contacts the first motor stop pin 54 at the end point of travel of the threaded member 52 and imparts a tangential stopping force to the threaded drive shaft 50 and/or the motor output shaft 16. One revolution of the threaded drive shaft 50 in the opposite direction moves the first member travel stop 56 away from the first motor stop pin 54.

In a similar fashion, a second motor stop pin 60 is positioned at the opposite end point of travel and after the next to last rotation of the threaded drive shaft 50, the second motor stop pin 60 contacts a second member travel stop 58 which imparts a tangential stopping force to the threaded drive shaft 50 and the motor output shaft 16. Once the motor 10 has been stopped by the travel limit stops of the present invention, its direction and the direction of the threaded member 52 can be easily reversed with almost no additional force needed to bring the actuator 4 back into a normal travel range.

It will be appreciated by those of ordinary skill in the art that many variations in the foregoing preferred embodiment are possible while remaining in the scope of the present invention. The present invention should thus not be considered limited in the preferred embodiments or the specific choices of materials, configurations, dimensions, applications or ranges of parameters employed therein.

What is claimed is:

1. A motor driven actuator employing a mechanical travel limit stop comprising:
   a motor having a rotating output shaft;
   a worm gear connected to said output shaft;
   an output mechanism having a curved slot and an axis of rotation, and having a drive gear meshingly engaging said worm gear where said worm gear rotates causing said drive to rotate said output mechanism about said axis of rotation, said output mechanism having a first mechanism stop surface at a first extreme of travel about said axis of rotation and a second mechanism stop surface at a second extreme of travel about said axis of rotation;
   an output pin engaging said curved slot moving in a linear direction as said output mechanism is rotated about said axis of rotation; and
   a motor stop pin radially protruding from said output shaft when at said first extreme of travel of said output mechanism said motor stop pin contacts said first mechanism stop surface, and where at said second extreme of travel of said output mechanism said motor stop pin contacts said second mechanism stop surface.

2. The motor driven actuator of claim 1, wherein said first mechanism stop surface is resilient for cushioning the inpact when said motor stop pin contacts said first mechanism stop surface at said first extreme of travel.

3. The motor driven actuator of claim 1, wherein said second mechanism stop surface is resilient for cushioning the impact when said motor stop pin contacts said second mechanism stop surface at said second extreme of travel.

4. The motor driven actuator of claim 1, wherein said motor stop pin is resilient for cushioning the impact when said motor stop pin contacts said first mechanism stop surface and said second mechanism stop surface.

* * * * *